(12) United States Patent
Ross et al.

(10) Patent No.: US 10,496,091 B1
(45) Date of Patent: Dec. 3, 2019

(54) BEHAVIOR AND INTENT ESTIMATIONS OF ROAD USERS FOR AUTONOMOUS VEHICLES

(71) Applicant: Waymo LLC, Mountain View, CA (US)

(72) Inventors: Stéphane Ross, Mountain View, CA (US); David Ian Franklin Ferguson, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 86 days.

(21) Appl. No.: 15/239,367

(22) Filed: Aug. 17, 2016

(51) Int. Cl.
| | | |
|---|---|---|
| G01C 22/00 | (2006.01) | |
| G05D 1/00 | (2006.01) | |
| G06N 5/04 | (2006.01) | |
| G06N 7/00 | (2006.01) | |
| G06N 20/00 | (2019.01) | |

(52) U.S. Cl.
CPC ............. *G05D 1/0088* (2013.01); *G06N 5/04* (2013.01); *G06N 7/005* (2013.01); *G06N 20/00* (2019.01)

(58) Field of Classification Search
CPC ........ G05D 1/0088; G06N 5/04; G06N 7/005; G06N 99/005
USPC .......................................................... 701/27
See application file for complete search history.

(56) References Cited

U.S. PATENT DOCUMENTS

| | | | |
|---|---|---|---|
| 8,660,734 B2 | 2/2014 | Zhu et al. | |
| 8,788,134 B1 | 7/2014 | Litkouhi et al. | |
| 8,954,252 B1 * | 2/2015 | Urmson | G08G 1/166 180/167 |
| 9,248,834 B1 * | 2/2016 | Ferguson | B60W 30/09 |
| 9,278,689 B1 | 3/2016 | Delp | |
| 9,381,916 B1 * | 7/2016 | Zhu | B60W 30/0956 |
| 9,481,367 B1 * | 11/2016 | Gordon | B60W 30/09 |
| 9,669,827 B1 * | 6/2017 | Ferguson | B60W 30/09 |
| 9,766,626 B1 * | 9/2017 | Zhu | B60W 30/0956 |
| 9,914,452 B1 * | 3/2018 | Ferguson | B60W 30/09 |
| 2010/0076621 A1 * | 3/2010 | Kubotani | G08G 1/166 701/1 |
| 2011/0246156 A1 * | 10/2011 | Zecha | G08G 1/166 703/6 |
| 2015/0112571 A1 * | 4/2015 | Schmudderich | B60W 30/08 701/93 |
| 2016/0068156 A1 * | 3/2016 | Horii | B60W 30/00 701/28 |

(Continued)

*Primary Examiner* — Harry Y Oh

(74) *Attorney, Agent, or Firm* — Botos Churchill IP Law LLP

(57) ABSTRACT

As an example, data identifying characteristics of a road user as well as contextual information about the vehicle's environment is received from the vehicle's perception system. A prediction of the intent of the object including an action of a predetermined list of actions to be initiated by the road user and a point in time for initiation of the action is generated using the data. A prediction of the behavior of the road user for a predetermined period of time into the future indicating that the road user is not going to initiate the action during the predetermined period of time is generated using the data. When the prediction of the behavior indicates that the road user is not going to initiate the action during the predetermined period of time, the vehicle is maneuvered according to the prediction of the intent prior to the vehicle passing the object.

20 Claims, 12 Drawing Sheets

(56) References Cited

U.S. PATENT DOCUMENTS

| | | | | |
|---|---|---|---|---|
| 2016/0327953 A1* | 11/2016 | Nilsson | | B60W 50/0097 |
| 2017/0106875 A1* | 4/2017 | Yamasaki | | B60R 16/037 |
| 2017/0132334 A1* | 5/2017 | Levinson | | G06F 17/5009 |
| 2017/0169703 A1* | 6/2017 | Carrasco | | B60Q 1/525 |
| 2017/0270374 A1* | 9/2017 | Myers | | B60Q 9/00 |
| 2017/0327112 A1* | 11/2017 | Yokoyama | | B60W 30/095 |
| 2018/0326982 A1* | 11/2018 | Paris | | B60W 30/0956 |
| 2019/0011917 A1* | 1/2019 | Kuffner, Jr. | | G05D 1/0088 |
| 2019/0066506 A1* | 2/2019 | Kazemi | | G08G 1/161 |
| 2019/0122037 A1* | 4/2019 | Russell | | G06K 9/00362 |

\* cited by examiner

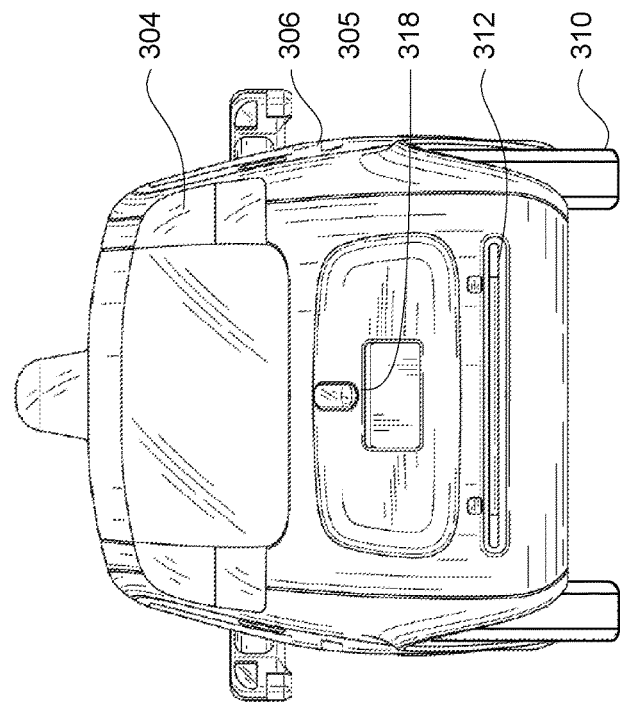
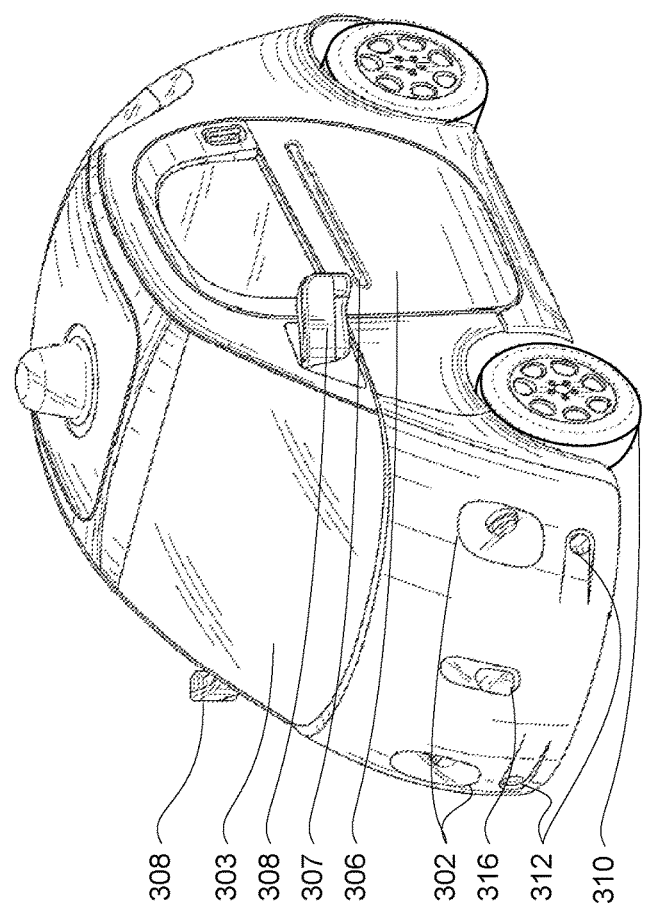
FIGURE 3C
FIGURE 3B

BEHAVIOR AND INTENT ESTIMATIONS OF ROAD USERS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects. Thus, detection, identification, and prediction are critical functions for the safe operation of autonomous vehicle.

BRIEF SUMMARY

One aspect of the disclosure provides a method of maneuvering a vehicle. The method includes receiving, by one or more processors, data from a perception system of the vehicle identifying an object corresponding to a road user, the information also identifying characteristics of the road user as well as contextual information about an environment in which the vehicle is currently driving; generating, by the one or more processors, a prediction of the intent of the object using the data, wherein the prediction of the intent of the object includes a next action to be initiated by the road user and a point in time for initiation of the next action, wherein the next action is included in a predetermined list of actions; generating, by the one or more processors, a prediction of the behavior of the road user for a predetermined period of time into the future using the data, the prediction of the behavior indicating a likelihood that the road user will initiate the next action during the predetermined period of time, the predetermined period of time including at least a period of time during which the vehicle is expected to have passed the object; and when the prediction of the behavior indicates that the road user is not likely to initiate the next action during the predetermined period of time, maneuvering, by the one or more processors, the vehicle according to the prediction of the intent prior to the vehicle passing the object.

In one example, the prediction of the intent includes the road user crossing the roadway in a crosswalk. In another example, the prediction of the intent includes the road user crossing a lane of a roadway not in a crosswalk. In another example, the method also includes generating a set of possible intents of the object using the data, wherein the each possible intent of the set of intents includes a corresponding next action to be initiated by the road user, wherein the prediction of the intent is a most likely possible intent of the set of possible intents. In this example, the method also includes, when the prediction of the behavior indicates that the road user is not likely to initiate a next action of a second possible intent of the set of intents during the predetermined period of time, maneuvering, by the one or more processors, the vehicle according to both the prediction of the intent and the second possible intent prior to the vehicle passing the object. In another example, the prediction of the intent includes the road user entering a driveway from the roadway. In another example, the prediction of the intent includes at least one of the road user entering or exiting a driveway onto the roadway. In another example, the prediction of the intent includes the road user unparking and entering the roadway. In another example, wherein the prediction of intent includes the road user passing through an intersection. In another example, the prediction of intent includes the road user changing lanes.

Another aspect of the disclosure provides a system for maneuvering a vehicle. The system includes one or more processors configured to receive data from a perception system of the vehicle identifying an object corresponding to a road user, the information also identifying characteristics of the road user as well as contextual information about an environment in which the vehicle is currently driving; generate a prediction of the intent of the object using the data, wherein the prediction of the intent of the object includes a next action to be initiated by the road user and a point in time for initiation of the next action, wherein the next action is included in a predetermined list of actions; generate a prediction of the behavior of the road user for a predetermined period of time into the future using the data, the prediction of the behavior indicating that the road user is not going to initiate the next action during the predetermined period of time, the predetermined period of time including at least a period of time during which the vehicle is expected to have passed the object; and when the prediction of the behavior indicates that the road user is not going to initiate the next action during the predetermined period of time, maneuver the vehicle according to the prediction of the intent prior to the vehicle passing the object.

In one example, the prediction of the intent includes the road user crossing the roadway in a crosswalk. In another example, the prediction of the intent includes the road user crossing a lane of a roadway not in a crosswalk. In another example, the one or more processors are further configured to generate a set of possible intents of the object using the data, wherein the each possible intent of the set includes a corresponding next action to be initiated by the road user, wherein the prediction of the intent is a most likely possible intent of the set of possible intents. In this example, the one or more processors are further configured to, when the prediction of the behavior indicates that the road user is not likely to initiate a next action of a second possible intent of the set of intents during the predetermined period of time, maneuver the vehicle according to both the prediction of the intent and the second possible intent prior to the vehicle passing the object.

A further aspect of the disclosure provides a method of maneuvering a vehicle. The method includes receiving information from a perception system of the vehicle identifying an object corresponding to a road user, the information also identifying characteristics of the object as well as contextual information about an environment in which the vehicle is currently driving; generating a prediction of the behavior of the object for a predetermined period of time into the future using the information, the prediction indicating that the object is not going to begin to cross a roadway during the predetermined period of time, the predetermined period of time including at least a period of time during which the vehicle will have passed the object if the vehicle continues at a current speed, acceleration, and heading;

generating a prediction of the intent of the object using the information, wherein the intent of the object includes intending to begin to cross the roadway at a point in time that is after an end of the predetermined period of time into the future; and maneuvering the vehicle according to the prediction of the intent by allowing the object to cross the roadway prior to the vehicle passing the object.

In one example, generating the prediction of the intent includes generating a set of predictions, wherein the set of predictions includes the prediction of the intent, and each given prediction of the set of predictions identifies a next possible action by the road user. In this example, beginning to cross the roadway is the next possible action by the road user for the prediction of intent. In another example, the prediction of the intent includes the road user crossing the roadway in a crosswalk. In another example, the road user is a pedestrian.

BRIEF DESCRIPTION OF THE DRAWINGS

FIGS. 3A-3D are a pictorial diagram of the system of FIG. 2 in accordance with aspects of the disclosure.

DETAILED DESCRIPTION

Overview

Figure 1:
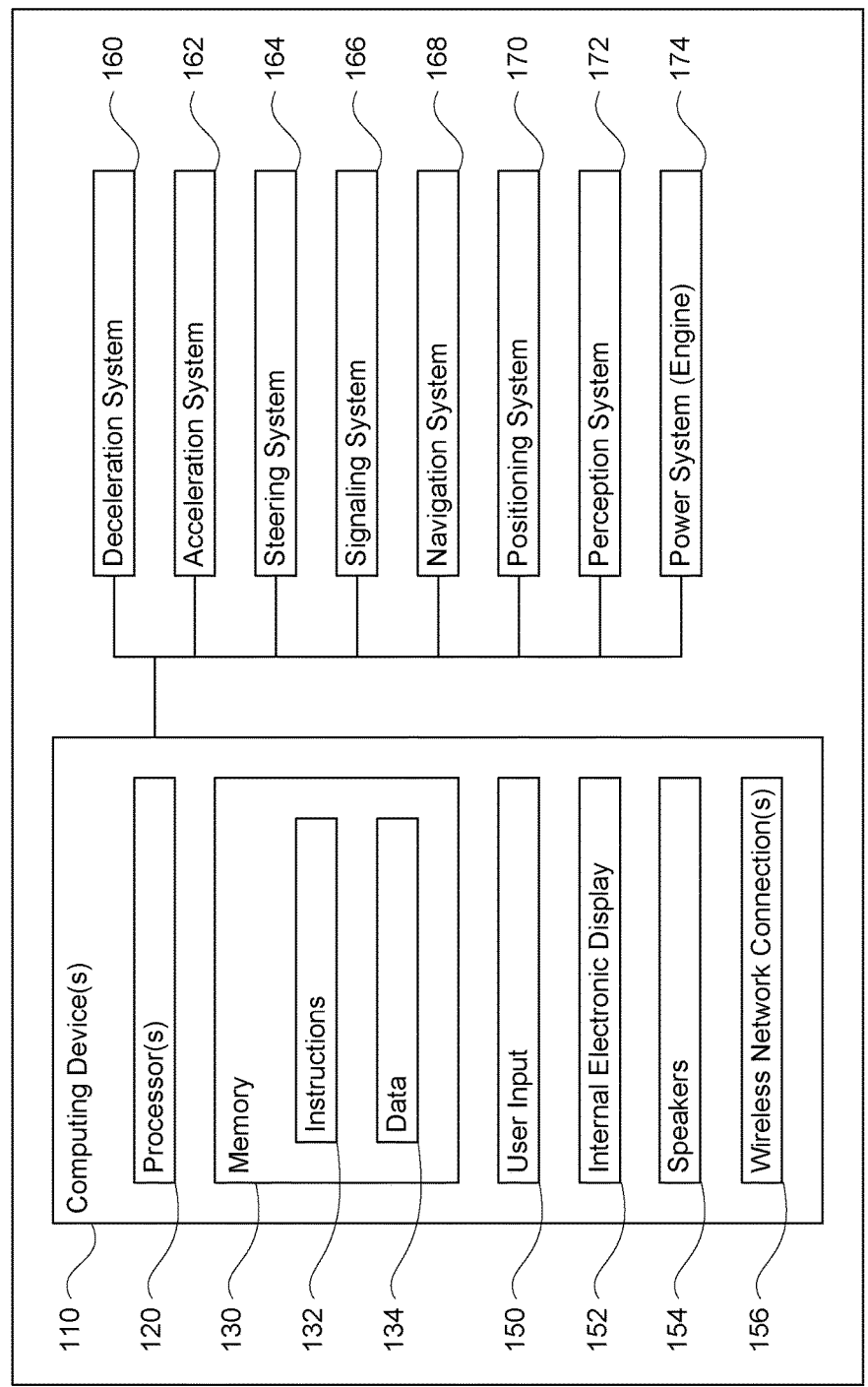
FIG. 1 is a functional diagram of an example vehicle in accordance with an exemplary embodiment.

Aspects of the technology relate to controlling autonomous vehicles, including for instances various cars, sport utility vehicles, busses, trucks, tractor-trailers, motorcycles, etc. Generally, these vehicles operate by detecting and identifying objects in the vehicle's environment. More sophisticated systems actually make predictions about what those objects (especially other road users like vehicles, bicyclists, and pedestrians) are likely to do for at least some short period of time into the future. Predicting what other objects are going to do is important so that the autonomous vehicle can act pre-emptively and make sure that the vehicle will not interfere with other road users or compromise their safety. However, there is a distinction between what an object will do for some period of time versus predicting what that object would like to do or its intent. For instance, a pedestrian standing still on the side of the road may want to cross but they won't step out in front of a vehicle unless that vehicle slows down and allows for them to cross. In a prediction sense, predicting that such a pedestrian will stay on the sidewalk for the next 5 seconds may be strictly correct. However, such predictions alone fail to consider what that pedestrian wants to do or rather, his or her intent. In other words, the pedestrian may really want to cross the road and will start to cross as soon as there is a gap in the stream of cars or some car stops for them.

In order to both make a prediction and reason about an object's intent, the vehicle's computing devices may receive information from a highly sophisticated perception system. For instance, a vehicle's perception system may use various sensors, such as LIDAR, sonar, radar, cameras, etc. to detect objects and their characteristics such as location, orientation, size, shape, type, direction and speed of movement, etc. These characteristics can be quantified or arranged into a descriptive function or vector.

Data received from the perception system may be used by a prediction system to make a prediction about what objects are going to do for a predetermined period of time. This is typically done by reasoning over what another road user will do over some time horizon. For instance, the vehicle's computing devices may generate a prediction of what a pedestrian will do over the next ten seconds, or over a time period corresponding to how long the autonomous vehicle, may interact with the pedestrian (e.g. until the pedestrian is well behind the autonomous vehicle).

In one example, data received from the perception system for an object, and in particular another road user, including the road user's characteristics as well as additional contextual information may be fed into a behavior-time model. The model may generate a set of possible hypotheses for a particular road user's behavior or what a particular road user will do in the future. The behavior-time models may provide these hypotheses for a particular time horizon or predetermined period of time and relative likelihoods for each hypothesis. These behavior-time models may be trained using data about how an object observed at that location behaved in the past, intuition, etc. The autonomous vehicle's computing devices can then reason about hypotheses that interact with the vehicle's future trajectory (for instance, defining a set of future locations where the vehicle will be at various times in the future) and are of a sufficient likelihood to be worth considering.

In addition, the vehicle's computing devices may generate a set of possible intents for a given road user by looking at all the possible actions that the road user could execute using intent models, similarly to generating actions for the predictions described above. However, in contrast to the predictions, these intents are not based on a fixed time horizon or predetermined period of time, but rather reflect the next action the road user will take. So for the case of a pedestrian standing on the side of the road waiting to cross, the pedestrian may be intending to cross and this is reflected by the fact that crossing the road is the next action the pedestrian takes. However, this action may not occur until the road is clear, which may be an arbitrary amount of time in the future.

A next action may be defined as an action that the road user will begin to take after waiting for some period of time or simply the next action the road user is expected to take which falls into a predetermined, pre-stored list of actions. Thus, to train a model to generate likelihoods for these intents, rather than using a fixed time horizon and observing what the object does during that fixed time horizon, the training data may look as far into the future as it takes for the road user to perform any action included in the list of predetermined actions. Then, the next action included in the predetermined list of actions that the road user ends up performing is marked as the correct intent from the object's original position (when the intent would be determined). In this regard, the intent of the object need not simply be the arbitrary action itself (i.e. making a left turn or a right turn), but rather the actual trajectory (for instance, defined by a set of locations where the object was located at different points in time) that the object follows. This is then may be used as input to train the model for predicting intent of an object.

With this intent information, the vehicle's computing devices can maneuver the vehicle in order to promote the object's intent. For example, if a pedestrian is predicted not to cross a roadway in a predetermined period of time, but the intent prediction is that the pedestrian would like to cross the roadway, the computing devices of the vehicle may control the vehicle to allow the pedestrian to cross the roadway. Similar maneuvering can be used to promote the intent of a bicyclist or vehicle. Reasoning about the intents of objects, such as other road users, is powerful and provides an additional level of sophistication, concern for others and robustness to the vehicle. It also allows the autonomous vehicle function in a more "human-like" or "polite" way.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
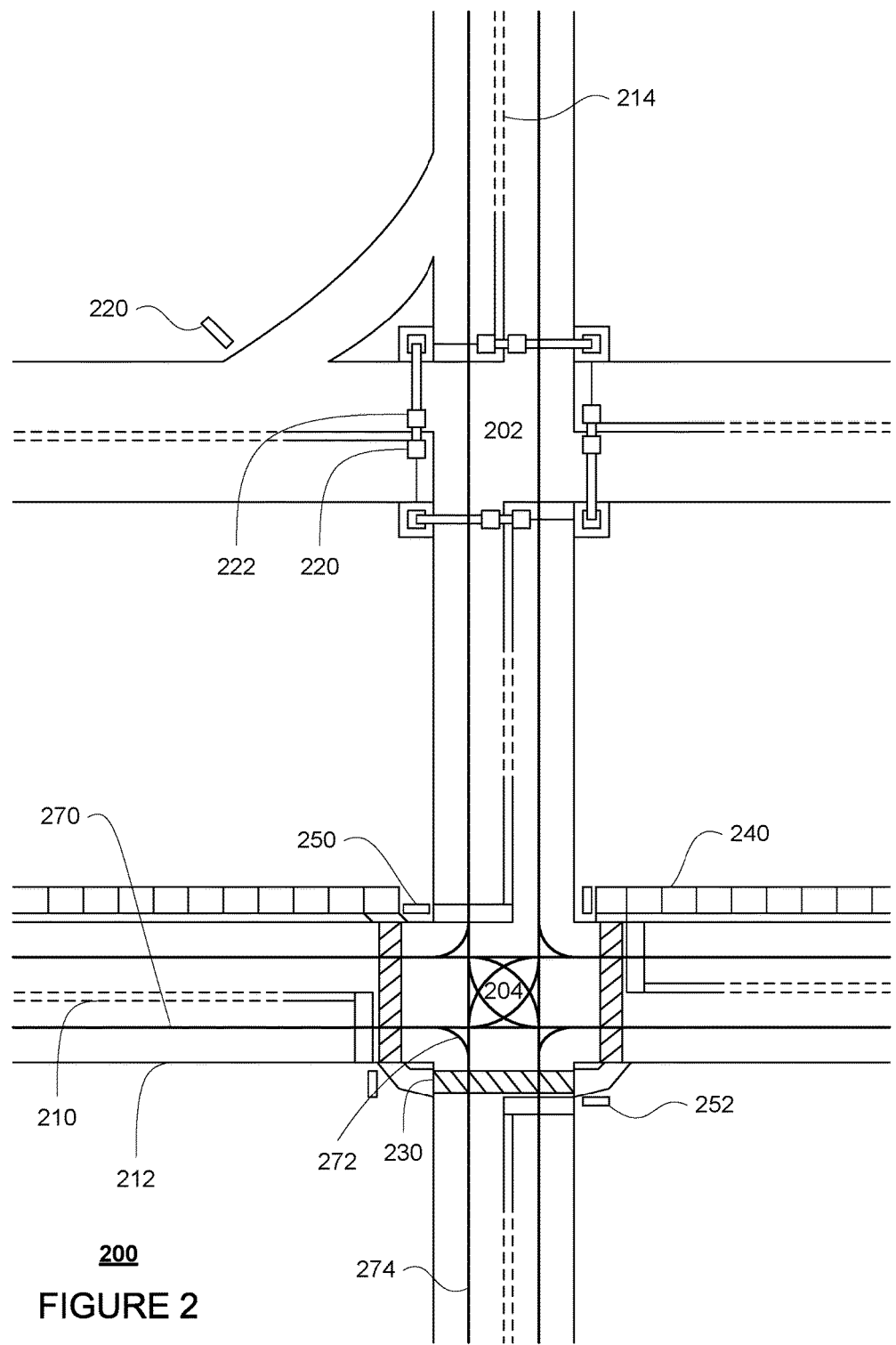
FIG. 2 is a functional diagram of an example system in accordance with an exemplary embodiment.
Figure 3A:
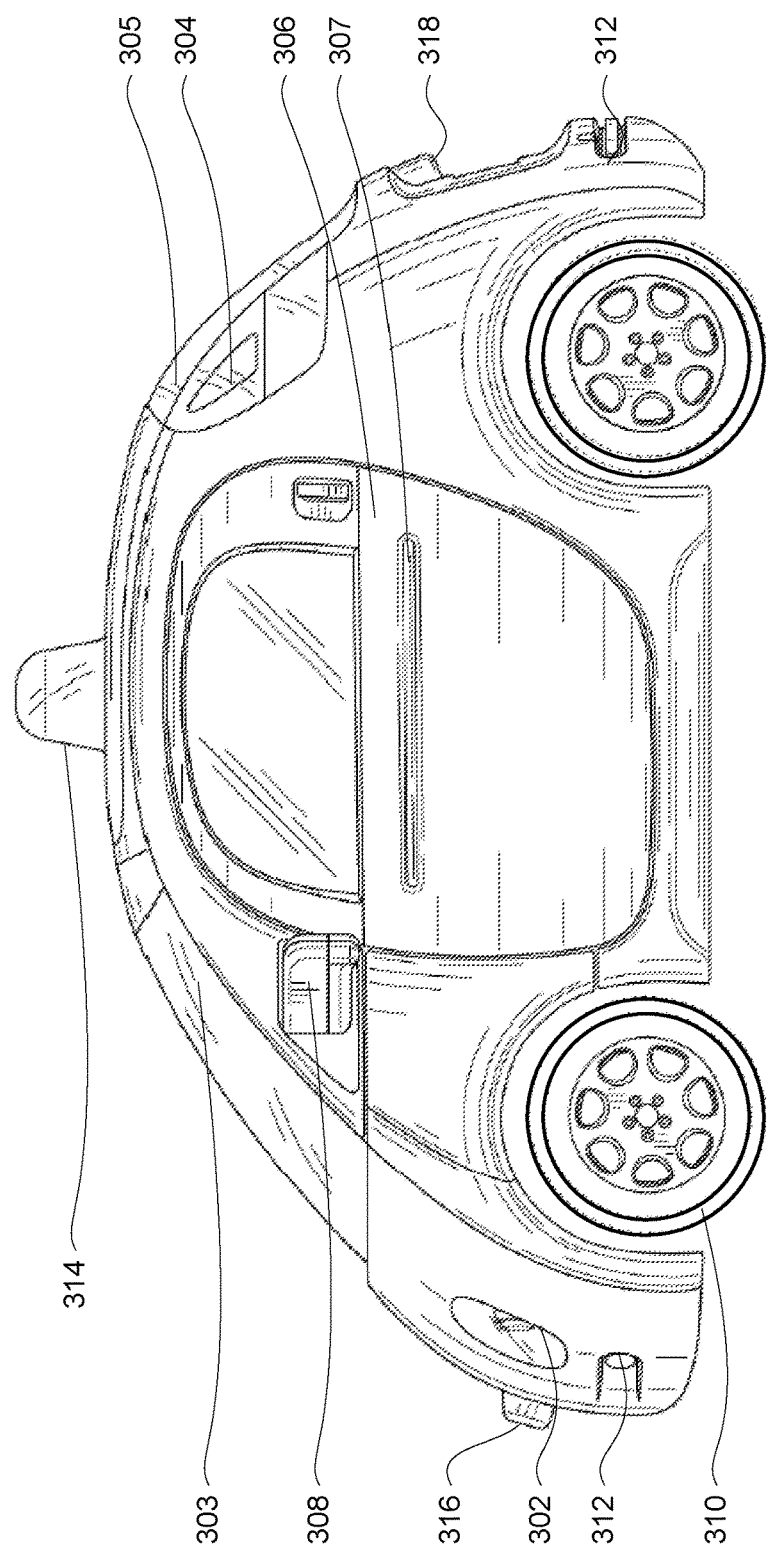
Figure 3D:
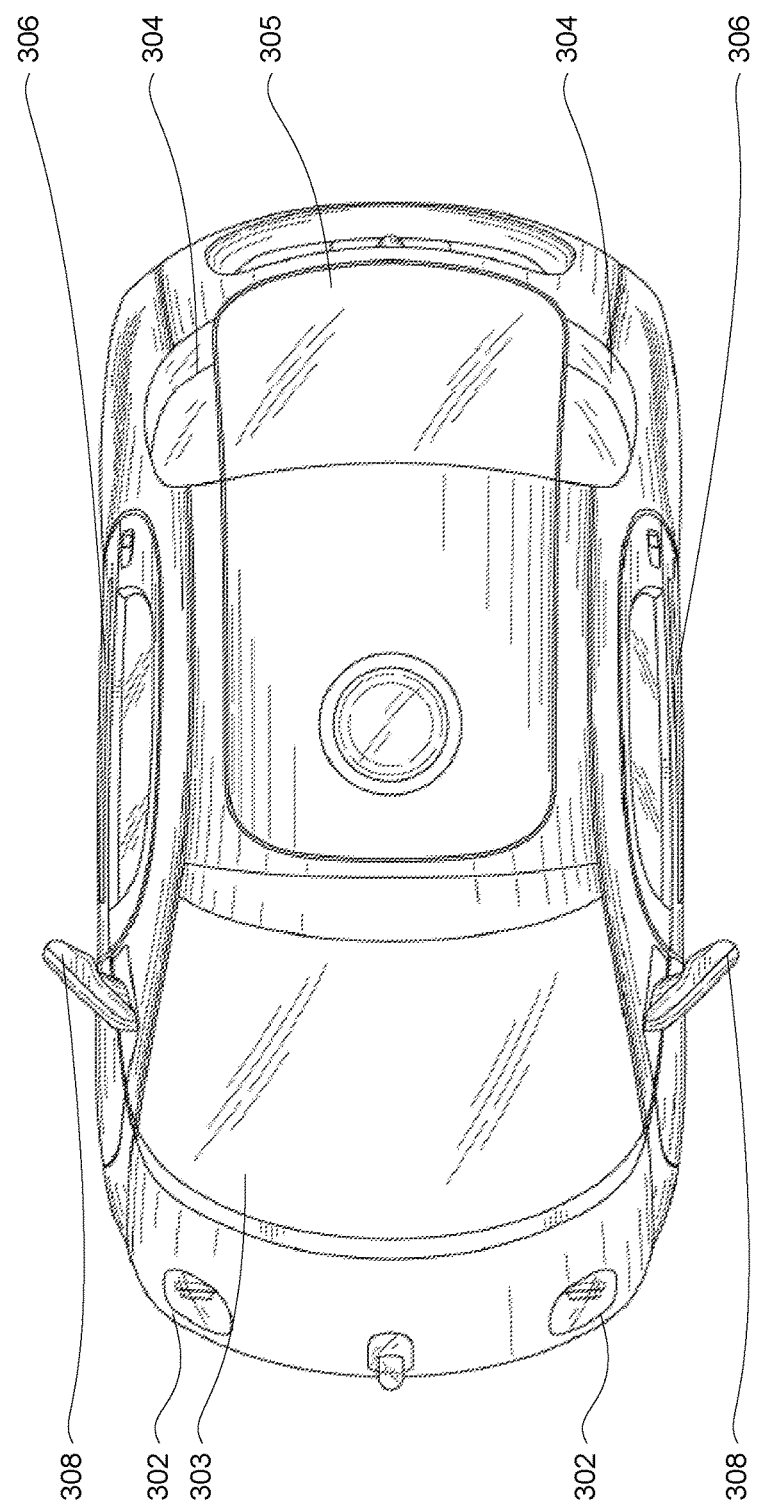

FIG. 2 is an example of map information 200 for a section of roadway including intersections 202 and 204. In this example, the detailed map information 200 includes information identifying the shape, location, and other characteristics of lane lines 210, 212, 214, traffic signal lights 220, 222, crosswalks 230, 232, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the detection system 170 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing device 110. As discussed in further detail below, computing device 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the detection system may also be incorporated into the typical vehicle components, such as taillights 304 and/or side view mirrors 308. Each of these radar, camera, and lasers devices may be associated with processing components which process data from these devices as part of the detection system 172 and provide sensor data to the computing device 110.

Data 134 may store various behavior-time models for predicting an objects future behavior for a predetermined period of time. For instance, data from the perception system 172 may be used to both make a prediction about what an object will do in the future. This is typically done by reasoning over what another road user will do over some time horizon. For instance, the vehicle's computing devices may generate a prediction of what a pedestrian will do over the next ten seconds, or over a time period corresponding to how long the autonomous vehicle, may interact with the pedestrian (e.g. until the vehicle has passed by and/or the pedestrian is at least some distance, such as 20 meters or more or less, behind the vehicle). Thus, the typical predetermined period may be 10 seconds or more or less, though shorter periods may be used where the object is likely to be passed by the vehicle (such that the object becomes no longer relevant to controlling the vehicle). This predetermined period of time may also be stored in data 134. Of course, the farther into the future the prediction is made, or rather the longer the predetermined period of time, the less reliable the prediction becomes.

Data 134 may store various behavior-time models for predicting an objects future behavior for a per-determined period of time. In one example, the behavior-time models may be configured to use data for an object received from the perception system 172, and in particular another road user, including the road user's characteristics as well as additional contextual information discussed in further detail below. As an example, given the location, heading, speed, and other characteristics included in the data from the perception system 172, the behavior-time models may provide a set of one or more predictions for how the object could behave for the predetermined period of time as well as a corresponding likelihood value for each prediction. The likelihood values may indicate which of the predictions are more likely to occur (relative to one another). In this regard, the prediction with the greatest likelihood value may be the most likely to occur whereas predictions with lower likelihood values may be less likely to occur.

The behavior-time models may be configured to generate a set of possible hypotheses for what a particular road user will do over a particular horizon or predetermined period of time (e.g. 10 seconds) and relative likelihoods for each hypothesis. These models may be trained using data about how an object observed at that location behaved in the past, intuition, etc. The computing device 110 can then reason about hypotheses that interact with the vehicle's trajectory and are of a sufficient likelihood to be worth considering.

In addition to predicting what an object will do for a predetermined period into the future, the computing devices 110 may also use data from the perception system to "reason" about another road user's intent. In this regard, data 134 may store intent models configured to use the raw data from the sensors and/or the characteristics described above in combination with contextual information to predict the next action of the predetermined list of actions that the road user is expected to take and a given point in time when that action is likely to be initiated by the other road user. Again, the predicted next action can include the action itself, but also a predicted trajectory (for instance, defining a set of future locations where the other road user will be at various times in the future) for that action.

As with the behavior-time models, the intent models may provide a set of possible intents or hypotheses identifying possible next actions (and predicted trajectories), a given point in time when the action is likely to occur, and associated likelihood values. As an example, given the location, heading, speed, and other characteristics included in the data from the perception system 172, the intent models may provide a set of one or more predictions for possible next actions. The likelihood values may indicate which of the predictions are more likely to occur (relative to one another). In this regard, the prediction with the greatest likelihood value may be the most likely to occur whereas predictions with lower likelihood values may be less likely to occur.

In order to provide these intents, data 134 may store the predetermined list of actions. This list may be generated manually, for instance, by human operators based on personal experience or observations of the actions of other road users (by such operators or from sensor data from perception systems of one or more autonomous vehicles such as vehicles 100 or 100A). The predetermined list of actions may actually include a plurality of sub-lists each associated with a particular type of road user, such as other vehicles, bicyclists, and pedestrians. For instance, for a vehicle, the predetermined list of actions may include following a current lane of the vehicle, changing lanes, turning at intersections, making a U-turns, entering or exiting driveways, pulling over, pulling out from a parking spot or parked position. Similarly, for cyclists, the predetermined list of actions may include all of the actions for vehicles as well as crossing crosswalks and "jaywalking" (for instance, crossing a roadway at a location other than an intersection or crosswalk). For a pedestrian, the predetermined list of actions may include crossing a roadway, crossing a roadway in a crosswalk, jaywalking, following a curb, sidewalk or edge of a lane at the side of road, entering a vehicle, etc. Moreover, the "actions" may be defined by trajectories corresponding to expected locations of an object corresponding to the object performing the action over time.

To train an intent model to generate a set of possible intents for an object, rather than using a fixed time horizon and observing what the object does during that fixed time horizon, the training data may look as far into the future as it takes for the road user to perform any action included in the list of predetermined actions. Then, the next action or trajectory of the object (for instance, defined by a set of locations where the object has been located) that corresponds to an action included in the list of predetermined actions that the road user ends up performing is marked as the correct intent from the object's original position (when the intent would be determined).

The computing device 110 may control the direction and speed of the vehicle by controlling various components. By way of example, computing device 110 may navigate the vehicle to a destination location completely autonomously using data from the detailed map information and navigation system 168. In order to maneuver the vehicle, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 4:
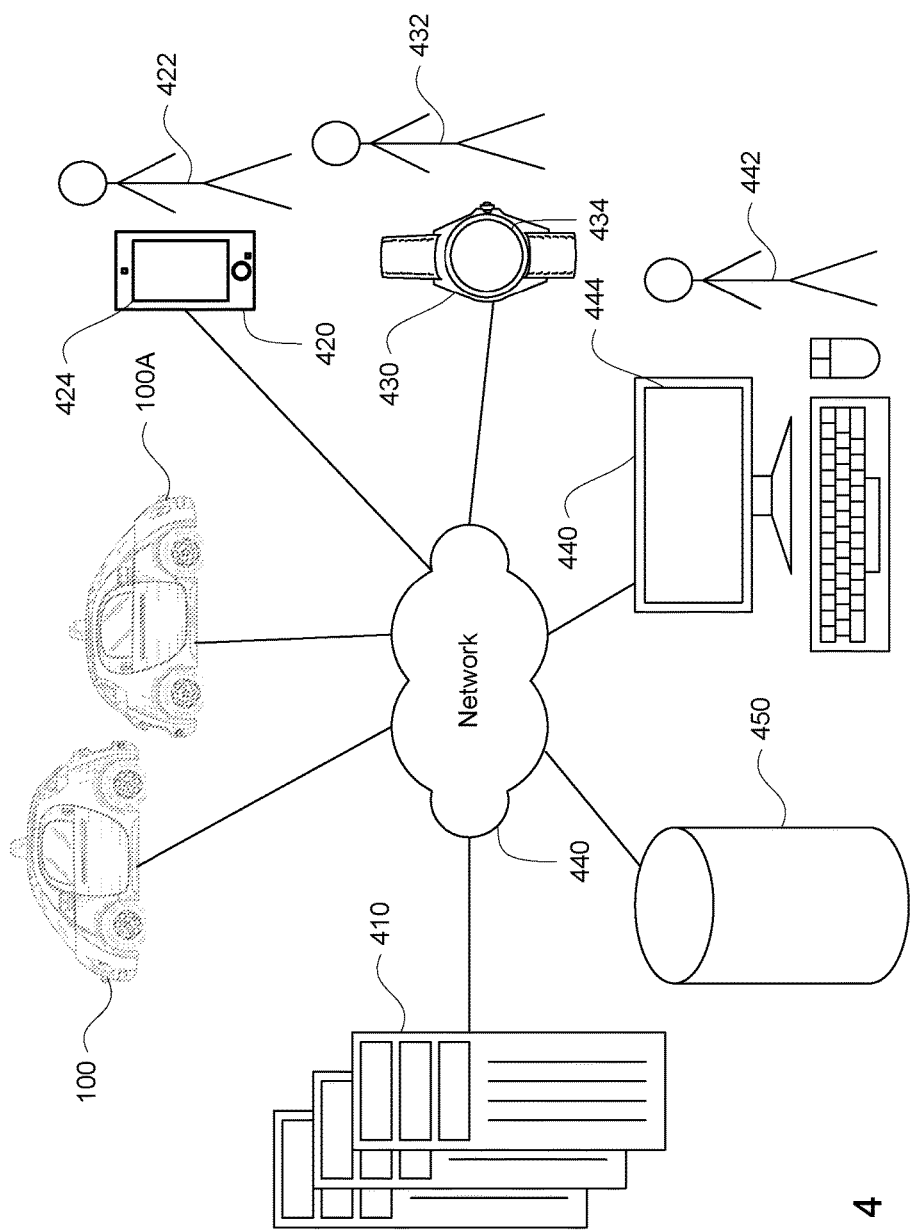
FIG. 4 is an example external views of a vehicle in accordance with aspects of the disclosure.
Figure 5:
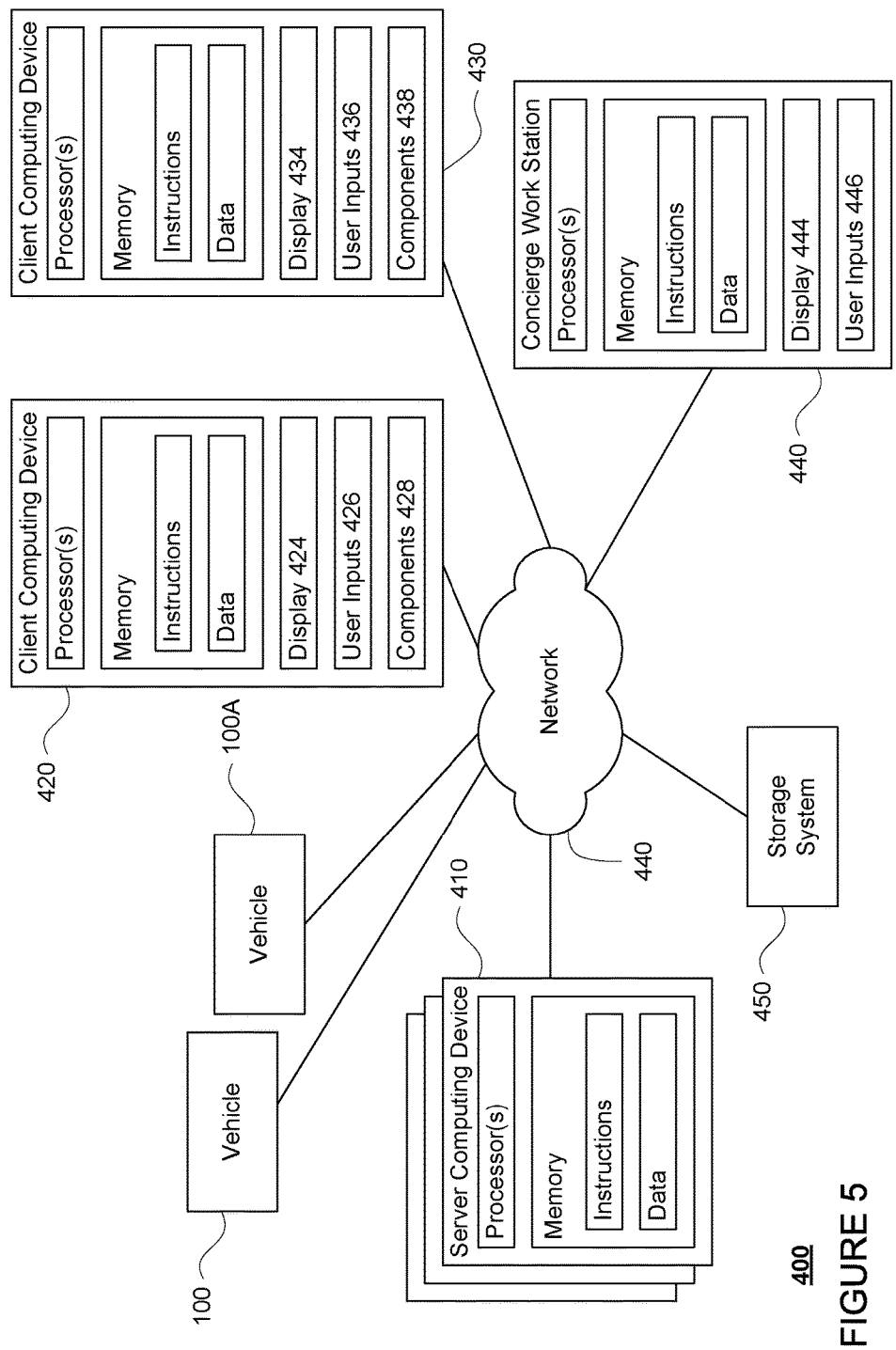
FIG. 5 is an example internal view of a vehicle in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 440. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 440, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with one or more computing devices 110 of vehicle 100 or a similar computing device of vehicle 100A as well as client computing devices 420, 430, 440 via the network 440. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 440 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, laptop, or a netbook that is capable of obtaining information via the Internet or other networks. In another example, client computing device 430 may be a wearable computing device, such as a "smart watch" as shown in FIG. 4. As an example the user may input information using a keyboard, a keypad, a multi-function input button, a microphone, visual signals (for instance, hand or other gestures) with a camera or other sensors, a touch screen, etc.

In some examples, client computing device 440 may be concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 440 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computer 110 may initiate the necessary systems to control the vehicle autonomously along a route to the destination location. For instance, the navigation system 168 may use the map information of data 134 to determine a route or path to the destination location that follows a set of connected rails of map information 200. The computing devices 110 may then maneuver the vehicle autonomously (or in an autonomous driving mode) as described above along the route towards the destination. FIGS. 6-9 are example views of vehicle 100 driving on a roadway 600 corresponding to the detailed map information 200.

Each of the examples depicts a section of roadway 600 including intersections 602 and 604. In this example, intersections 602, 604, and 606 corresponds to intersections 202 and 204 of the map information 200, respectively. In this example, lane lines 610, 612, and 614 correspond to the shape, location, and other characteristics of lane lines 210, 212, and 214, respectively. Similarly, crosswalks 630 and 632 correspond to the shape, location, and other characteristics of crosswalks 230 and 232, respectively; sidewalks 640 correspond to sidewalks 240; traffic signal lights 622, 624, and 626 correspond to traffic signal lights 222, 224 and 226, respectively; stop signs 650, 652 correspond to stop signs 250, 252, respectively; and yield sign 660 corresponds to yield sign 260. In each example, vehicle 100 is following a route (indicated by dashed lines 670, 770, 870, 970, 1070) to a destination (not shown).

Figure 6:
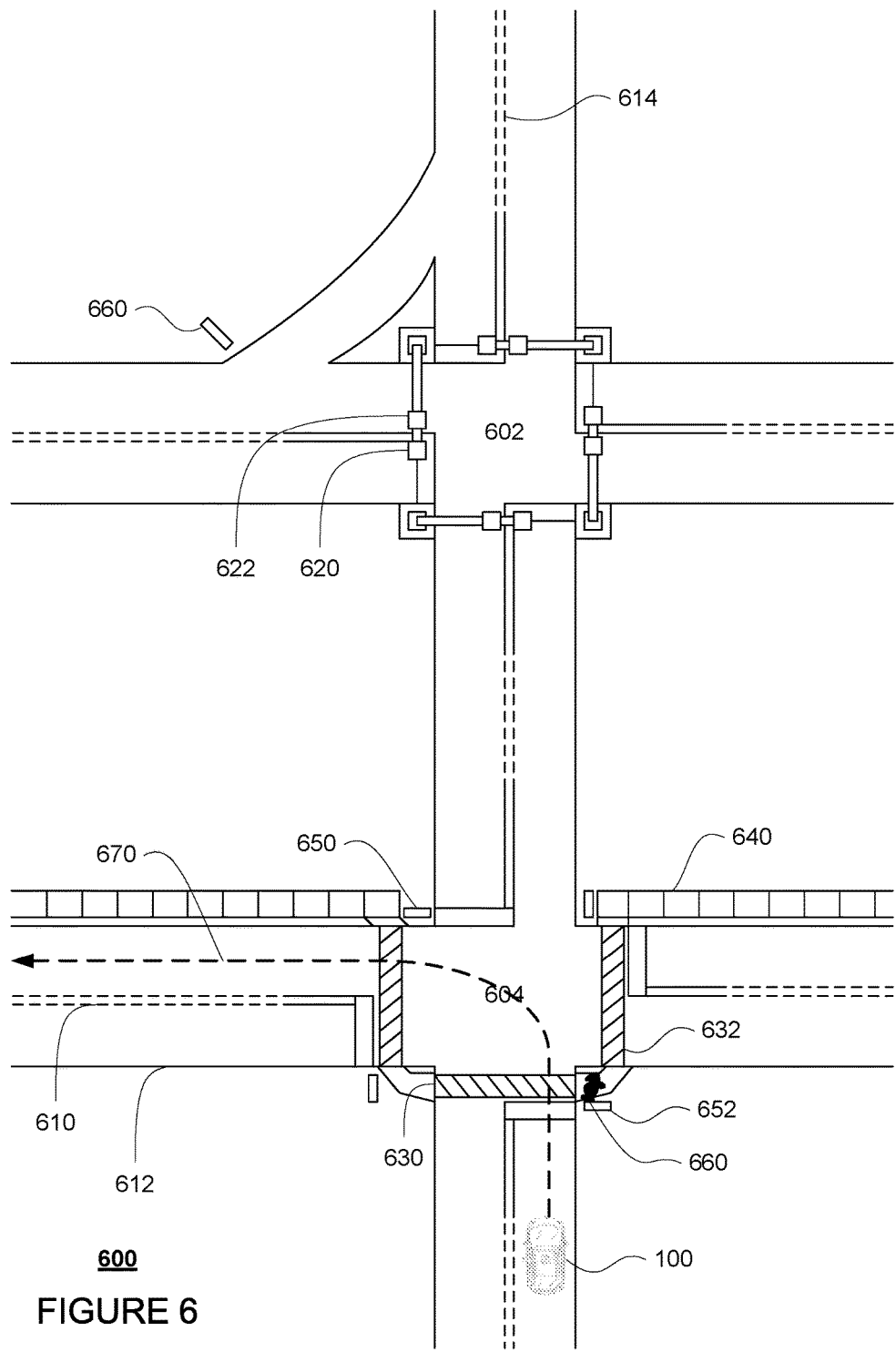
FIGS. 6-9 are example views of vehicles in accordance with aspects of the disclosure.
Figure 7:
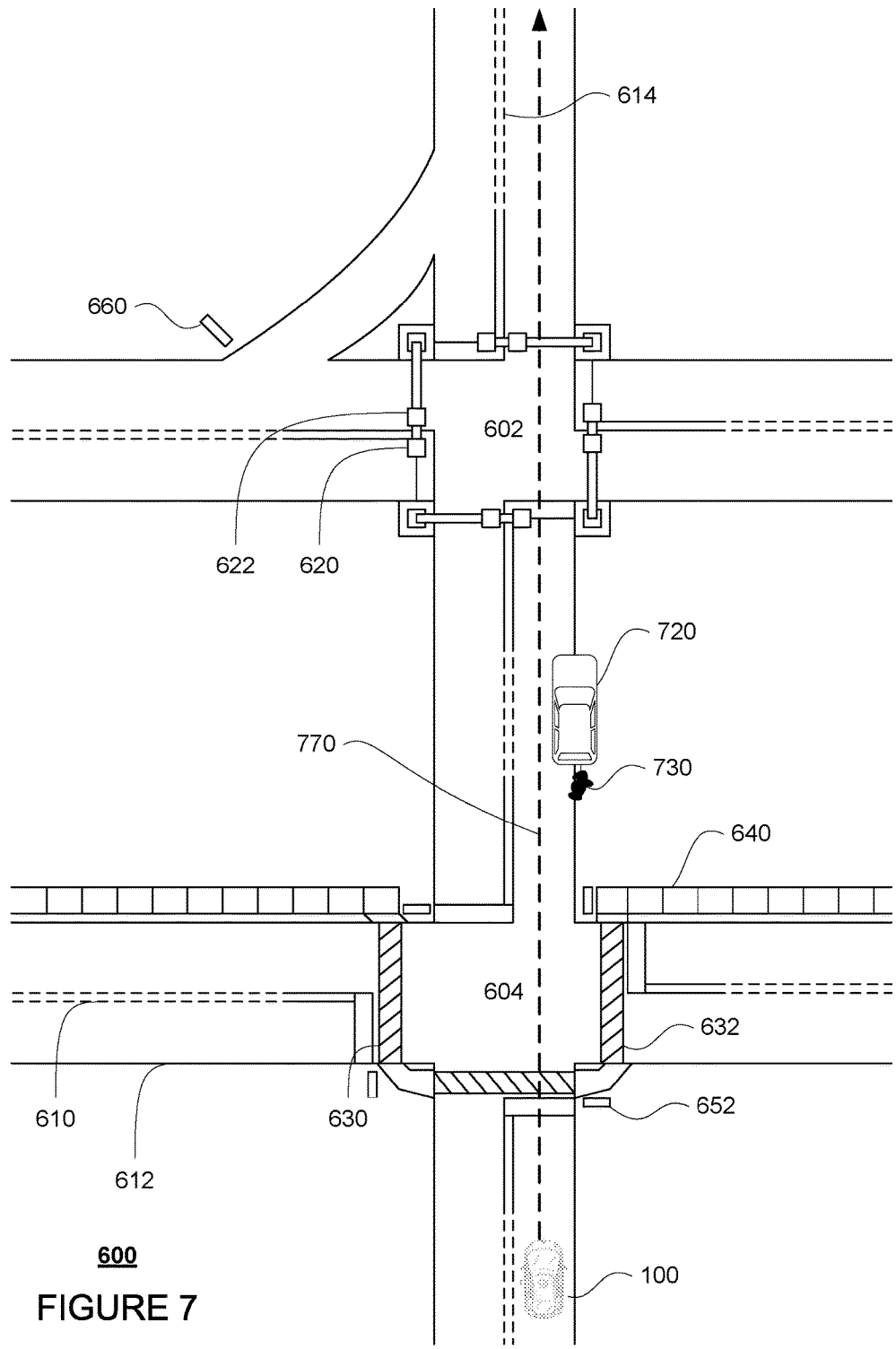
Figure 8:
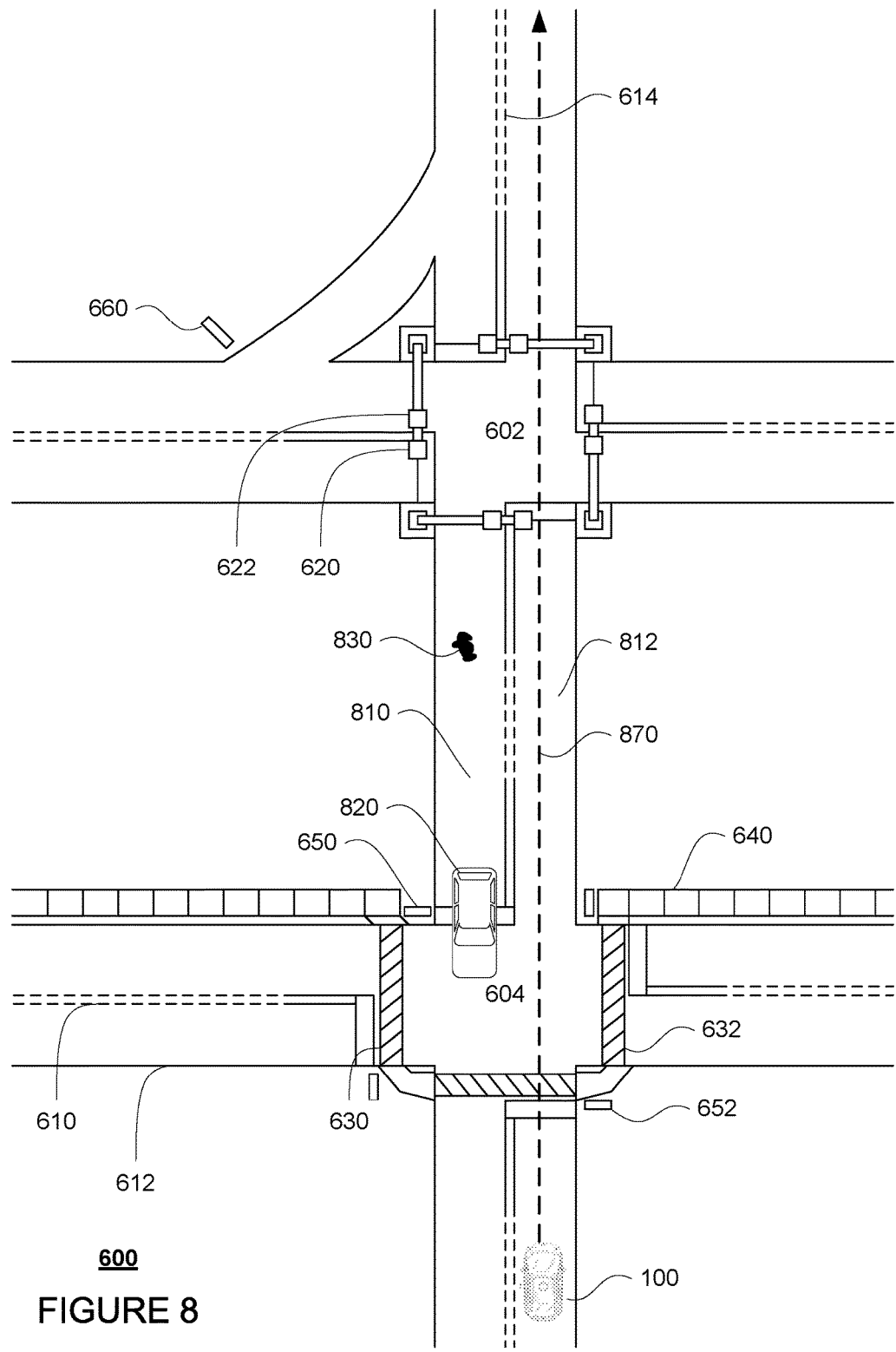
Figure 9:
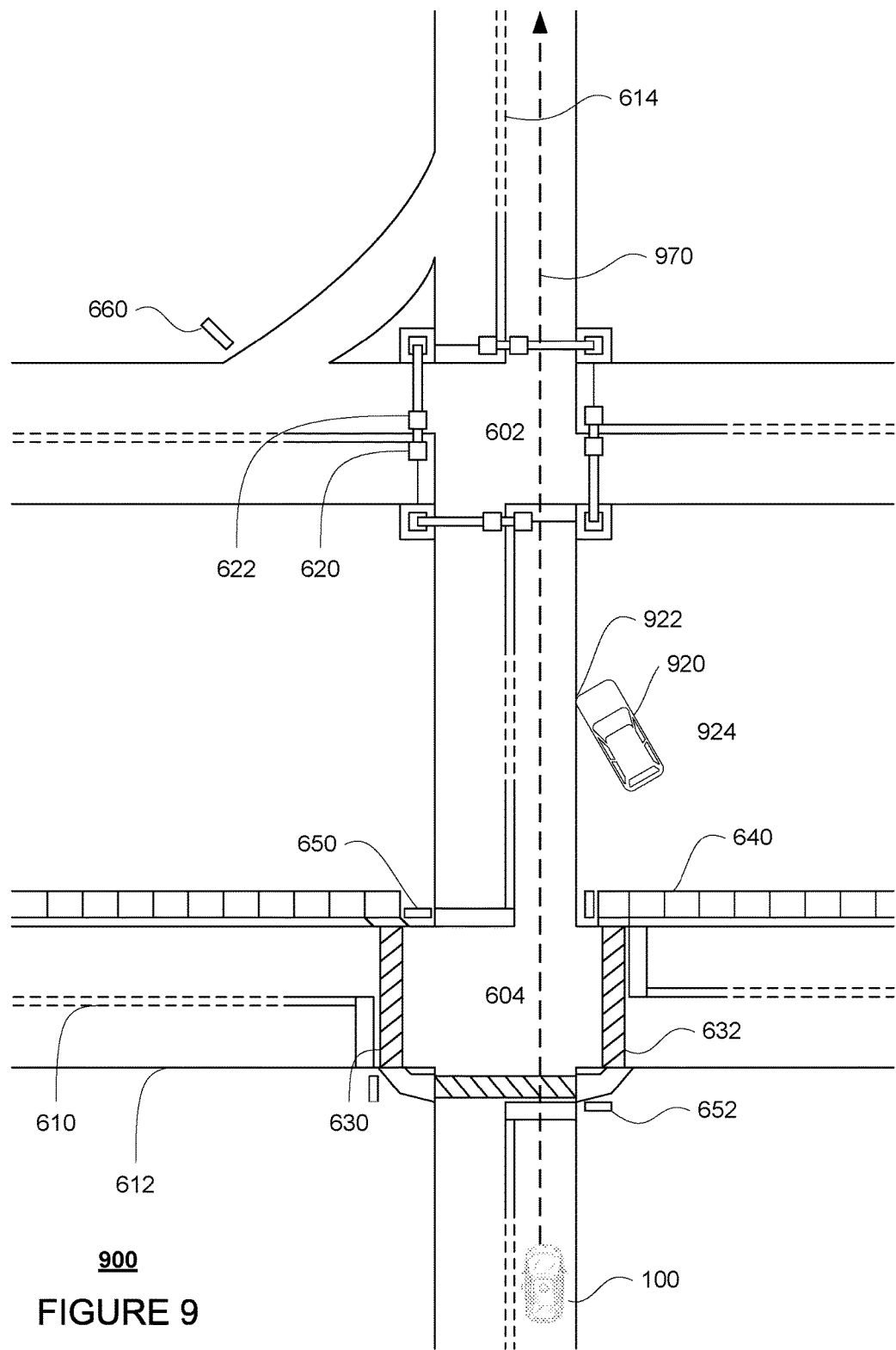

As noted above, as the vehicle is being maneuvered by the computing device 110, the perception system 172 may provide the computing devices with information about objects, including other road users, detected in the vehicle's environment. For instance, FIG. 6 depicts vehicle 100 approaching intersection 604 in order to make a left turn. The perception system 172 may provide the computing device 110 with information about pedestrian 660 such as its location, heading, velocity, etc. FIG. 7 depicts vehicle 100 approaching intersection 604 and moving towards intersection 602. The perception system may provide the computing device with information about vehicle 720 as well as pedestrian 730 standing behind the vehicle 720. FIG. 8 depicts vehicle 100 approaching intersection 604 and moving towards intersection 602. The perception system may provide the computing device with information about vehicle 820 as well as pedestrian 830 walking across a first lane 810 of the roadway between intersection 602 and 604. FIG. 9 depicts vehicle 100 approaching intersection 604 and moving towards intersection 602. The perception system may provide the computing device with information about vehicle 920 located proximate to an edge 922 of the roadway at a parking lot 924 between intersections 602 and 604. In this example, parking lot 920 may also be defined in the detailed map information 200.

The raw data and/or characteristics of another road user received from the perception system may be used with contextual information as input to a behavior-time model of data 134 to make a prediction about what other road users are going to do for the predetermined period of time. For instance, information such as the road user's type, location, recent motion heading, acceleration, and velocity may be combined with other information such as where the pedestrian is in the world using the detailed map information discussed above (e.g. proximity to an intersection, crosswalk, or crosswalk buttons) and used as input to a behavior-time model. The contextual information may also include the status of other objects in the environment such as the states of traffic lights, features of other objects (such as vehicles) that might be crossing the pedestrian's path or a crosswalk near the pedestrian may also be used as input to the model. In addition, specific details about the road user including gaze detection (i.e. where does the road user appear to be looking, if applicable), proximity to crosswalk buttons, whether the road user is attempting to push a crosswalk button, pointing in a particular direction, or standing in road, etc., may also be contextual information and used as input to the model.

As noted above, the behavior-time model may provide a set of hypotheses each having an associated likelihood value. As an example, one or more of those hypotheses with the highest likelihoods (or those above a particular threshold such that a given hypothesis is considered to have a reasonable likelihood of occurrence) may be identified as an actual future trajectory or behavior prediction for the object over the predetermined period of time. For instance, if the road user is a pedestrian wanted to cross a roadway, the prediction for the predetermined period of time may include details about where the pedestrian is expected to be during the course of the predetermined period of time. As an example, this may include a period during which the vehicle is expected to pass the pedestrian according to the vehicle's current or expected speed, acceleration, and heading.

For instance, the vehicle's computing devices may use a behavior-time model to generate a prediction of what a road user will do during the next predetermined period of time (e.g. 10 seconds) or a time period corresponding to how long the vehicle 100 is likely to interact with the road user (e.g. until the road user is well behind the autonomous vehicle). Returning to FIG. 6, the computing device may predict that pedestrian 660 is going to remain stationary or wait proximate to the crosswalk 630 without entering the crosswalk for the next 10 seconds (or until the vehicle 100 passes by the pedestrian 660). In other words, the location and velocity of the pedestrian 660 in combination with the location of the vehicle 100 as well as other contextual information may make it most likely that the pedestrian will not cross the crosswalk 630 until after vehicle 100 has passed by the pedestrian.

Regarding FIG. 7, the computing device may use a behavior-time model to predict that pedestrian 730 will remain behind the vehicle 720 for the next 10 seconds (or until the vehicle 100 passes by the pedestrian 730. Thus, in this example, the location and velocity of the pedestrian in combination with the location of the vehicle 100 as well as other contextual information may make it most likely that the pedestrian will remain behind the vehicle 730 until after vehicle 100 has passed by the pedestrian.

For FIG. 8, the computing device may use a behavior-time model to predict that pedestrian 730 will remain in lane 830 for the next 10 seconds (or until the vehicle 100 passes by the pedestrian 730). Thus, in this example, the location and velocity of the pedestrian in combination with the location of the vehicle 100 as well as other contextual information may make it most likely that the pedestrian will remain in the lane 810 until after vehicle 100 has passed by the pedestrian.

Regarding FIG. 9, the computing device may use a behavior-time model to predict that the vehicle 920 will remain stationary proximate to edge 922 for the next 10 seconds (or until the vehicle 100 passes by the vehicle 920). Thus, in this example, the location and velocity of the pedestrian in combination with the location of the vehicle 100 as well as other contextual information may make it most likely that the pedestrian will remain proximate to edge 922 until after vehicle 100 has passed by the pedestrian.

In addition to making a prediction for the predetermined period of time, the raw data and/or characteristics of another road user received from the perception system as well as additional contextual information may be used as input to an intent model of data 134 to make a prediction about whether the road user will eventually take any of the actions of the predetermined list of actions. In other words, without using any particular limitation on the timing of the action, the computing device 110 may use an intent model of data 134 to estimate when the other road user is likely to initiate and/or complete one of the actions of the predetermined list of action of data 134. As with the behavior-time model, the intent model may provide a set of intents or hypotheses identifying a possible next action (or predicted trajectory corresponding to an action) included in the predetermined list of actions, a given point in time when the action is likely to occur, and associated likelihood values. As an example, one or more of those hypotheses with the highest likelihoods (or those above a particular threshold) may be identified as a predicted intent including the next action and predicted trajectory for the road user.

For instance, turning to FIG. 6, given the location and velocity of the pedestrian 660 in combination with the location of the vehicle 100 as well as other contextual information may make it most likely that the pedestrian will cross the crosswalk 630 until after vehicle 100 has passed by the pedestrian. Thus, the predicted next action (and predicted trajectory) for pedestrian 660 may be to cross crosswalk 630. In FIG. 7, the location and velocity of the pedestrian 730 in combination with the location of the vehicle 100 as well as other contextual information may make it most likely that the pedestrian will enter vehicle 720 after vehicle 100 has passed by the pedestrian. Thus, the predicted next action (and predicted trajectory) for pedestrian 730 may be to enter vehicle 720. In FIG. 8, the location and velocity of the pedestrian 830 in combination with the location of the vehicle 100 as well as other contextual information may make it most likely that the pedestrian will cross into lane 812 in order to complete crossing the roadway after vehicle 100 has passed by the pedestrian. Thus, the predicted next action (and predicted trajectory) for pedestrian 830 may be to cross lane 812. In FIG. 9, the location and velocity of the vehicle 920 in combination with the location of the vehicle 100 as well as other contextual information may make it most likely that the vehicle 920 will cross edge 922 to leave parking lot 924 after vehicle 100 has passed by the vehicle 920. Thus, the predicted next action (and predicted trajectory) for vehicle 920 may be to cross edge 922 to leave parking lot 924.

In many cases, including the examples above, the next actions (and predicted trajectories) may be predicted to occur after the predetermined period of time and thus are important cues to the intent of a particular road user. In other words, the computing devices may determine that it is not likely (or the likelihood value is relatively low) that the object will initiate the predicted next action within the predetermined period of time. In this regard, the predetermined list of actions may allow the computing devices to predict another road user's intent even where the road user will not act on that intent during the predetermined period of time (i.e. not until the road user has been passed by the vehicle 100), for instance because the roadway is not clear or it is otherwise not safe to initiate the action associated with the intent. Various examples of intent and actions for a pedestrian may include, for instance, a pedestrian waiting to cross the road, the intent is to cross the road when clear (as with the example of FIG. 6); a pedestrian standing at the front or rear of a vehicle, the intent may be to enter the vehicle when traffic is clear (as with the example of FIG. 7); and a pedestrian walking behind traffic towards a median, the intent is to cross over the entire road when traffic is clear (as with the example of FIG. 8). Examples for a vehicle may include, for instance, a vehicle waiting to pass into oncoming traffic from a driveway or parking lot, the intent is to enter the roadway when clear (as with the example of FIG. 9); a vehicle waiting to turn across oncoming traffic into a driveway, the intent is to enter driveway when clear; a vehicle waiting to turn left at an unprotected intersection, the intent is to turn left when clear; a vehicle waiting its turn at a four way stop and will wait until other higher precedence vehicles have had their chance to go, the intent is to travel through intersection; a vehicle waiting in a driveway, the intent is to pull out into a lane; a vehicle waiting at an intersection, the intent is to move through the intersection when clear; a vehicle moving towards another lane, the intent is to change lanes when desired lane is free of traffic; a vehicle waiting on the side of a roadway, the intent may be to unpark and pull out onto the roadway. Of course, any of these examples with a vehicle may also apply to bicyclists.

With this intent information, the vehicle's computing device 110 can maneuver the vehicle in order to promote the other road user's intent. In this regard, the computing devices may use the predicted trajectory of the predicted intent to control the vehicle. For example, if a pedestrian is predicted not to cross a roadway in a predetermined period of time, but the intent prediction is that the pedestrian would like to cross the roadway, the computing devices of the vehicle may control the vehicle to allow the pedestrian to cross the roadway according to the predicted trajectory. Turning to FIGS. 6-8, this would involve vehicle 100 stopping and waiting for pedestrian 660 to cross in crosswalk 630, stopping and waiting for pedestrian 730 to cross the roadway or enter vehicle 720, and stopping an waiting for pedestrian 830 to cross lane 812. Similar maneuvering can be used to promote the intent of a bicyclist or vehicle. For instance, in FIG. 9, this would involve vehicle 100 stopping and waiting for vehicle 920 to exit from parking lot 924 and cross edge 922.

In addition, as noted above, the computing devices may actually use the predicted trajectories of multiple different predicted intents. This may be especially useful where many different predicted trajectories for predicted intents including the same next action have a high or even low likelihood value of occurring. For instance, the computing devices may use the predicted trajectories of multiple different intents for a road user where those intents each have a high (25%-30% likelihood value). This may be likely to occur when there is relative uncertainty about which action the road user actually intends to take.

However, even where the object will not perform the next action of the predicted intent within the predetermined period of time, the vehicle's computing devices need not always control the vehicle in order to promote the predicted intent of the other road user. In general, in any given situation, the computing devices may consider multiple factors to determine whether it should maneuver the vehicle in such a way as to promote the predicted intent of the road user, and depending on context, may or may not promote the predicted intent. For instance, if promoting the intent is not actually appropriate for the current situation, the computing devices may actually ignore the predicted intent, such as when doing so would be unsafe for the object and/or the vehicle. As an example, the computing devices may detect a pedestrian that intends to cross the road not in a crosswalk.

If the computing devices would have to brake very hard in order to abruptly decelerate the vehicle, it may actually be safer not to stop and wait for the pedestrian to cross but rather to proceed passed the pedestrian without stopping or yielding (slowing down if needed).

Similar actions may be taken where the vehicle may actually have precedence (or the legal right of way according to traffic laws included in the map information) relative to the other road user. For instance, in some situations, the vehicle may have precedence to another vehicle that is unparking, exiting a driveway, or turning at an intersection. In these cases, the computing devise may actually act on the precedence, rather than slowing down or stopping to let the other road user with lower precedence act on the predicted intent for the road user.

In addition, in cases where the vehicle has lower precedence, the computing devices may be more inclined to react to the intent of other road users with higher precedence. In an example scenario, the computing devices may be determining whether the vehicle can pass around another road user that is stopped in traffic ahead of the vehicle. More specifically, the computing devices may be deciding whether or not to pass to the right of a stopped vehicle ahead of the vehicle. The prediction of intent may include that the stopped vehicle intends to proceed straight at an upcoming intersection, while the vehicle needs to turn right at that same intersection. If there is enough room to the right of the stopped vehicle, in such scenarios, the computing devices may consider the prediction of the stopped vehicle's intent, because that stopped vehicle has higher precedence over the vehicle (i.e. the stopped vehicle is directly in front of the vehicle). If the stopped vehicle also intends to turn right, the computing devices may decide to stay behind the stopped vehicle to let that stopped vehicle make the right turn. Alternatively, if the prediction intent includes a very high likelihood that the stopped vehicle is not intending to turn right, and there's sufficient room (i.e. more than some multiple greater than the width of the vehicle) to the right of the stopped vehicle, the computing devices may control the vehicle to go ahead and pass around the stopped vehicle to the right of the stopped vehicle in order to turn right at the intersection.

Figure 10:
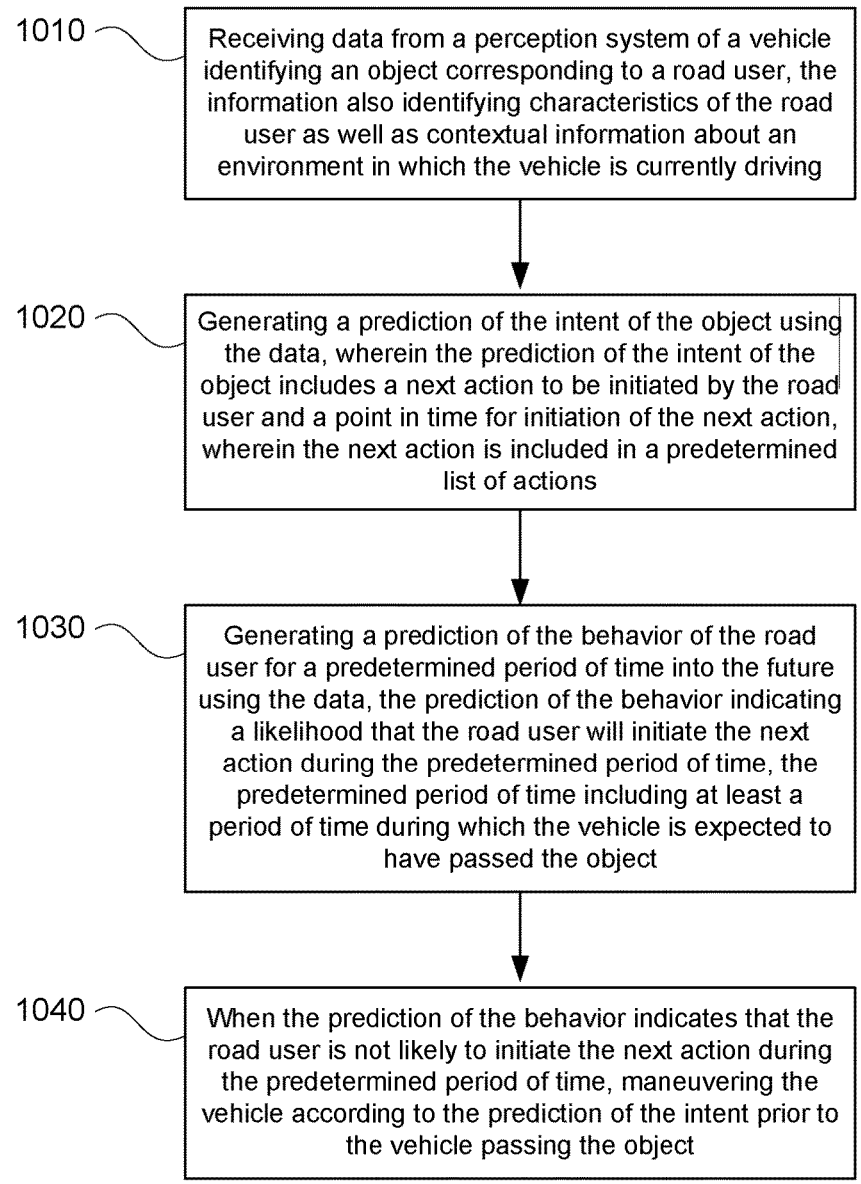
FIG. 10 is an example flow diagram in accordance with aspects of the disclosure.

FIG. 10 is an example flow diagram 1000 in accordance which may be performed by one or more computing devices of a vehicle, such as computing device 110 of vehicle 100. In this example, data is received from a perception system of the vehicle identifying an object corresponding to a road user. The information also identifies characteristics of the road user as well as contextual information about an environment in which the vehicle is currently driving at block 1010. A prediction of the intent of the object is generated using the data at block 1020. The prediction of the intent of the object includes a next action (and predicted trajectory) to be initiated by the road user and a point in time for initiation of the next action. In addition, the next action (or predicted trajectory corresponding to an action) is included in a predetermined list of actions. A prediction of the behavior of the road user for a predetermined period of time into the future is generated using the data at block 1030. The prediction of the behavior a likelihood that the road user will initiate the next action (and predicted trajectory) during the predetermined period of time. The predetermined period of time includes at least a period of time during which the vehicle is expected to have passed the object. At bock 1040, when the prediction of the behavior indicates that the road user is not likely to initiate the next action (and predicted trajectory) during the predetermined period of time, the vehicle is maneuvered according to the prediction of the intent prior to the vehicle passing the object.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of maneuvering a vehicle, the method comprising:
  receiving, by one or more processors, data from a perception system of the vehicle identifying a road user, the data also identifying characteristics of the road user as well as contextual information about an environment in which the vehicle is currently driving;
  generating, by the one or more processors, a prediction of an intent of the road user using the data, wherein the prediction of the intent of the road user includes that the road user crossing a roadway on which the vehicle is currently driving and a point in time for the road user crossing the roadway;
  generating, by the one or more processors, a prediction of a behavior of the road user for a predetermined period of time into the future using the data, the prediction of the behavior indicating the road user is unlikely to cross the roadway until after a future time that the vehicle is expected to have passed the road user; and
  maneuvering, by the one or more processors, the vehicle in order to promote the prediction of the intent over the prediction of the behavior to allow the road user to cross the roadway before the vehicle passes the road user.

2. The method of claim 1, wherein the road user is a pedestrian.

3. The method of claim 1, wherein the road user is a bicyclist.

4. The method of claim 1, wherein generating the prediction of an intent includes selecting an action from a predetermined list of actions including at least a first action of crossing a roadway at a location other than a crosswalk and a second action of crossing a roadway in crosswalk.

5. The method of claim 4, further comprising:
  determining a type of the road user; and
  selecting the predetermined list of actions from a plurality of predetermined lists of actions based on the type of the road user.

6. The method of claim 4, wherein each of the first action and the second action is defined by a trajectory corresponding to expected locations of an object performing that action.

7. The method of claim 1, wherein generating the prediction of the behavior includes using a first model and generating the prediction of the intent includes using a second model different from the first model.

8. The method of claim 7, wherein the first model is configured to predict what the road user will do over a particular time horizon, and the second model is configured to predict a next action using a predetermined list of actions by looking as far into the future as it takes for the road user to perform the next action.

9. The method of claim 7, wherein the road user crossing the roadway on which the vehicle is currently driving is an action of a predetermined list of actions.

10. The method of claim 1, further comprising, determining whether the point in time is beyond the future time that the vehicle is expected to have passed the road user, and wherein maneuvering the vehicle is further based on the determining.

11. A system for maneuvering a vehicle, the system comprising:
one or more processors configured to:
receive data from a perception system of the vehicle identifying a road user, the data also identifying characteristics of the road user as well as contextual information about an environment in which the vehicle is currently driving;
generate a prediction of an intent of the road user using the data, wherein the prediction of the intent of the road user includes the road user crossing a roadway on which the vehicle is currently driving and a point in time for the road user crossing the roadway;
generate a prediction of a behavior of the road user for a predetermined period of time into the future using the data, the prediction of the behavior indicating that the road user is unlikely to cross the roadway until after a future time that the vehicle is expected to have passed the road user; and
maneuver the vehicle in order to promote the prediction of the intent over the prediction of the behavior to allow the road user to cross the roadway before the vehicle passes the road user.

12. The system of claim 11, wherein the road user is a pedestrian.

13. The system of claim 11, wherein the road user is a bicyclist.

14. The system of claim 11, wherein the one or more processors are further configured to generate the prediction of an intent by selecting an action from a predetermined list of actions including at least a first action of crossing a roadway at a location other than a crosswalk and a second action of crossing a roadway in crosswalk.

15. The system of claim 14, wherein the one or more processors are further configured to:
determine a type of the road user; and
select the predetermined list of actions from a plurality of predetermined lists of actions based on the type of the road user.

16. The system of claim 14, wherein each of the first action and the second action is defined by a trajectory corresponding to expected locations of an object performing that action.

17. The system of claim 14, wherein the one or more processors are further configured to generate the prediction of the behavior includes using a first model and generating the prediction of the intent includes using a second model different from the first model.

18. The system of claim 17, wherein the first model is configured to predict what the road user will do over a particular time horizon, and the second model is configured to predict a next action using a predetermined list of actions by looking as far into the future as it takes for the road user to perform the next action.

19. The system of claim 11, wherein the road user crossing the roadway on which the vehicle is currently driving is an action of a predetermined list of actions.

20. The system of claim 11, wherein the one or more processors are further configured to determine whether the point in time is beyond the future time that the vehicle is expected to have passed the road user, and maneuver the vehicle further based on the determining.

* * * * *